Patented Mar. 14, 1944

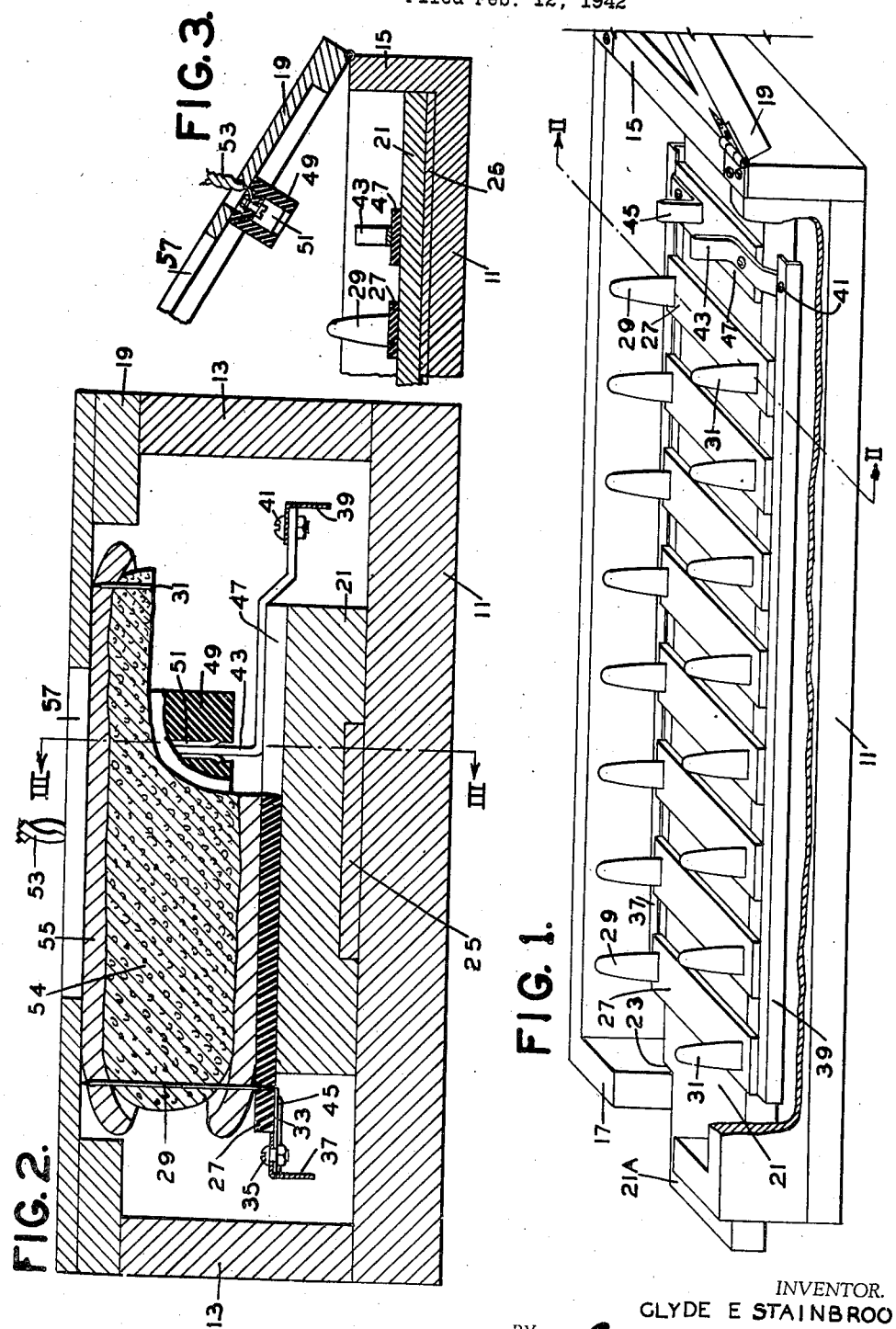

2,344,373

UNITED STATES PATENT OFFICE 2,344,373

ELECTRIC COOKER

Clyde E. Stainbrook, Memphis, Tenn.

Application February 12, 1942, Serial No. 430,582

3 Claims. (Cl. 219—19)

This invention relates to improvements in electric cookers in which the article to be cooked is made use of to complete an electric circuit and the resistance of such article to the passage of the current is employed to provide the necessary heat to accomplish cooking of the article, and it further relates to the detail of construction employed in effecting the practical utilization of the resistance set up in an electric circuit for accomplishing such cooking purposes.

It has long been known that heating may be accomplished by introducing in an electric circuit a resistance coil which is raised to high temperature by the resistance set up therein to the flow of the current, and such heat has been used for cooking purposes.

The present device contemplates the direct substitution of the article to be cooked for such resistance coil and the establishment of cooking heat within the article which is to be cooked, and primarily contemplates a device for cooking frankfurters or similar sausages of elongated shape, and fairly uniform cross-sectional area, by the passage of the current therethrough, the sausage structure establishing sufficient resistance to accomplish the cooking.

The objects of the invention are:

To provide a cooking unit in which spaced contacts of an electrical circuit may be effected with opposite end portions of a sausage of frankfurter type or the like;

To provide a cooking unit in which a sandwich of that type, commonly known as a "hot dog," may be secured and the cooking of the sausage content of such sandwich and the heating of the bread portion be concurrently effected;

To provide a cooking unit carrier which may be readily removed for loading and subsequent unloading;

To provide such a cooking unit carrier which is de-energized during removal or replacement;

To provide such a carrier in combination with housing mechanism which effects energization of the units by closure of a housing cover, and de-energization by opening said cover to permit access to said carrier;

To provide means for mounting and connecting a plurality of independently connected and concurrently heated units in such a removable carrier.

The means by which the foregoing and other objects are accomplished and the method of their accomplishment will readily be understood from the following specification upon reference to the accompanying drawing, in which:

Fig. 1 is a perspective view of the preferred type showing the housing with a removable carrier placed therein, such carrier being provided with eight individual cooker units, which here are shown empty and de-energized.

Fig. 2 is a transverse section of the housing and carrier taken through one of the cooker units and is on a vertical plane containing the line II—II of Fig. 1, with a hot dog to be cooked in place, a portion of the hot dog being broken away to indicate in the background a portion of the switch through which the circuit connection is established by closure of the housing.

Fig. 3 is a fragmentary longitudinal section on the same scale as the perspective view, showing the housing cover partially open.

Referring now to the drawing in which the various parts are indicated by numerals:

11 is the bottom, 13 the sides and 15 and 17 the ends of a housing, which preferably is of wood, and is adapted to receive the carrier. One end of the housing, as the end 17, is partially open to permit projection of the carrier, and to the other end 15 a cover 19 is hingedly secured.

The carrier comprises a base 21, preferably of wood, and of length to extend from end to end of the housing and project through the open end 17 thereof. The base is preferably wider than the opening through the end 17 and is reduced in width adjacent such end to form shoulders 23, one only shown, which cooperate with the end 17 to prevent dislodgement of the base when in the housing. The reduced end 21—A of the base extending beyond the end 17 provides a convenient handle or grip by which the carrier may be placed in, or removed from, the housing. The base 21 is preferably held against displacement laterally within the housing, as by a longitudinally disposed spline 25 secured to the base 11 in cooperation with a complementary channelway in the underside of the base.

Transversely disposed across the base 21, preferably at uniform intervals, are blocks 27 of insulating material which are firmly secured to the base 21 in any suitable or desired manner. Preferably the opposite ends of the blocks of insulating material, as more clearly shown in Fig. 2, project laterally beyond the base 21 and are apertured to receive contact fingers 29 and 31, the fingers preferably so tightly fitting the apertures that it is necessary to force the fingers into place and they are thereby held without other securing means, though such securing means may obviously be provided should it be so desired.

Preferably the fingers are thin flat bars of metal and are sharpened at their upper ends so that they are adapted to penetrate and impale the article to be cooked thereon. If flat they are so disposed that the flat surfaces of the one are parallel to the flat surfaces of the others. At the lower ends each of the fingers 29 is bent at right angles to form outward beneath the related block end to form a portion 33 which extends laterally to and is secured, as by a bolt 35, or rivet, to a bus bar 37, similar portions of the opposed fingers 31 extending oppositely outward and being similarly secured to an opposite bus bar 39.

The bus bars 37 and 39 extend longitudinally along the base into adjacency with the end of the base abutting the end 15 of the housing and are there respectively connected, as by suitable bolts or rivets 41, to contact members which terminate respectively in vertically disposed fingers 43 and 45, these contact members being suitably secured to and supported by a block of insulation 47, which in turn is fixedly secured to and carried by the base 21, and forming the plug member of a plug and socket switch.

Secured to the cover 19 is the socket member 49 of the switch adapted to cooperate with the plug fingers 43 and 45, the socket member having the usual socket plates, as the plates 51, with which the plug fingers 43 and 45 establish respective contacts when the cover is closed. 53 are circuit wires extending from a suitable current source, preferably the usual 110 or 220 volt A. C. lighting circuit, which is not here shown.

As will be seen in Fig. 3, the socket member establishes contact when the cover is closed and breaks this contact when it is opened, the socket member, in usual and well known fashion, fully housing the ends of the live circuit wires and establishing no current in the carrier-supported plug fingers, or any other part of the carrier, except when they are actually in use and the cover is closed to house them from accidental contact therewith.

In using the device an uncooked sausage, as the sausage 54, is placed between the upper and lower halves of a bun 55 and the opposite end portions of the bun and sausage are forced down against the sharpened upper edges of an opposed pair of contacts 29 and 31, the sharpened edges of the contacts cutting through the lower half of the bun, the sausage, and the upper half of the bun, impaling their opposite ends and effecting electrical contact with both thereof. This operation is repeated until all of the units are filled, or such less number as may be desired. This may be done with the carrier in place in the housing, but ordinarily at least two carriers are employed so that one may be emptied and reloaded while the hot dogs on the other are being cooked. After loading the carrier in the housing is removed and the just filled one placed within the housing, the forward end of the carrier base sliding along and being guided by the spline 25 until the base strikes the end 15 of the housing, after which the handle end 21—A is lowered and seated. The cover 19 is then closed, contact being established through the socket member 49 and the fingers 43 and 45 to the two bus bars 37 and 39, and circuits completed in parallel through the sausages of the various units.

It is found that apparently substantially no current flows through the bun, which seemingly acts substantially as a non-conductor, and that the entire flow is through the sausage, the resistance to flow being sufficient to heat up and cook an ordinary hot dog sausage in about three and one-half minutes with a 110 volt current. Apparently also the resistance to current flow is greatest at the beginning of this cooking operation and as cooking proceeds and the moisture is driven off from the sausage current flow seems to progressively decrease to such an extent that when cooking has been completed heating action substantially ceases and cooking and burning does not seem to occur.

I claim:

1. A cooking device, comprising a housing and a self-contained cooking assembly removably disposed therein, said assembly including a base member of insulating material having at one end a handle portion of reduced width, said base member carrying a plurality of electrically energizable units, a pair of plug fingers, and circuit leads from said finger to said units; said housing including an open top box adapted to receive and house said assembly, one end of said box being cut away to allow said handle portion to extend thereoutside, means within said box adapted to longitudinally center said assembly and particularly said plug fingers, and a cover, hingedly secured to said box oppositely to said cut-away end, cooperating with said box to complete an enclosure for said assembly, socket means, complementary to said plug fingers, carried by said cover adjacent said hinged end, and circuit leads connected to said socket means, said socket means being alined by said cover with said plug fingers and movable with said cover into circuit completing contact therewith, to complete circuits to said units on closure of said cover, said cover being openable to completely deenergize said units and to permit access to said units, and to allow removal and replacement of said base member and parts carried thereby.

2. A cooking device, comprising a housing and a self-contained cooking assembly removably disposed therein, said assembly including a base member of insulating material having at one end a handle portion of reduced width, a plurality of units, carried by and longitudinally spaced along said base member, each unit comprising a pair of impalement fingers carried by said base member and extending upward therefrom, said fingers being spaced apart laterally of said base to establish therebetween a gap substantially conforming to the length of the article to be cooked, and said fingers being adapted to support said article and make electric contact therewith by impalement of said article, and a pair of bus bars in parallel respectively connected in multiple to the opposite fingers of said plurality of units, each said bus bar respectively having connected thereto an upwardly extending plug finger; said housing including an open top box adapted to receive and house said cooking assembly, one end of said box being cut away to allow said handle portion to extend thereoutside, means within said box adapted to longitudinally center said assembly and particularly said plug fingers, and a cover, hingedly secured to said box oppositely to said cutaway end, cooperating with said box to complete an enclosure for said assembly, socket means, complementary to said plug fingers, carried by said cover adjacent said hinged end, and circuit leads connected to said socket means, said cover being openable to permit access to said units, and to allow removal and replacement of said base member and parts carried thereby, and said socket alined with said plug fingers and movable with said cover into circuit completing contact with said fingers to complete circuit leads to said bus bars on closure of said cover, and to completely de-energize said bus bars and units on opening of said cover.

3. In a cooking device, a housing, a base member of insulating material having at one end a handle portion of reduced width, a plurality of units, carried by and longitudinally spaced along said base member, and comprising impalement fingers extending upward therefrom, said fingers in pairs being spaced apart laterally of said base to establish gaps substantially conforming to the length of the article to be cooked, circuit leads connecting opposite said fingers in sets, each said lead terminating in an upwardly extending plug finger, said plug fingers being disposed adjacent the end of said base member remote from said handle; said housing including an open top box adapted to receive and house said base and parts carried thereby, one end of said box being cut away to allow said handle portion to extend thereoutside, means within said box adapted to longitudinally center said base and particularly said plug fingers, and a cover, hingedly secured to said box oppositely to said cut-away end, cooperating with said box to complete an enclosure for said assembly, socket means, complementary to said plug fingers, carried by said cover, adjacent said hinged end, and circuit leads connected to said socket means, said socket means being alined with said plug fingers by said cover, and movable therewith, to complete circuit leads to said impalement fingers on closure of said cover, said cover being openable to completely de-energize said bus bars and units, and permit access to and removal and replacement of said base member and parts carried thereby, said cover having a longitudinal slot of less width than the spacing of said fingers to permit visual observation of articles impaled on said fingers during cooking.

CLYDE E. STAINBROOK.